United States Patent
Nakamura et al.

(10) Patent No.: US 12,013,026 B2
(45) Date of Patent: Jun. 18, 2024

(54) VEHICLE LUBRICATION SYSTEM AND CONTROL APPARATUS FOR THE SYSTEM

(71) Applicant: TOYOTA JIDOSHA KABUSHIKI KAISHA, Toyota (JP)

(72) Inventors: Ryoto Nakamura, Toyota (JP); Tomonori Uchida, Toyota (JP); Atsushi Teshima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/893,600

(22) Filed: Aug. 23, 2022

(65) Prior Publication Data
US 2023/0184321 A1   Jun. 15, 2023

(30) Foreign Application Priority Data
Aug. 24, 2021   (JP) .................................. 2021-136686

(51) Int. Cl.
*F16H 57/04*   (2010.01)

(52) U.S. Cl.
CPC ..... *F16H 57/0413* (2013.01); *F16H 57/0417* (2013.01); *F16H 57/0435* (2013.01); *F16H 57/0439* (2013.01); *F16H 57/0476* (2013.01)

(58) Field of Classification Search
CPC ............. F16H 57/0417; F16H 57/0435; F16H 57/0476; F16H 57/0439
See application file for complete search history.

(56) References Cited

U.S. PATENT DOCUMENTS

| | | | | |
|---|---|---|---|---|
| 5,022,494 A | * | 6/1991 | Yamakage | F28D 15/04 165/47 |
| 6,527,074 B1 | * | 3/2003 | Morishita | B60K 6/543 903/909 |
| 7,516,807 B2 | * | 4/2009 | Carlson | B60K 25/00 180/65.21 |
| 8,544,624 B2 | * | 10/2013 | Grethel | F16H 61/0021 192/3.58 |
| 10,578,020 B2 | * | 3/2020 | Kenworthy | F02C 3/04 |
| 11,761,344 B1 | * | 9/2023 | Miller | F01D 25/10 60/646 |
| 2016/0265652 A1 | * | 9/2016 | Nishimine | B60W 20/15 |

(Continued)

FOREIGN PATENT DOCUMENTS

JP   2019-162927 A   9/2019

*Primary Examiner* — Michael A Riegelman
(74) *Attorney, Agent, or Firm* — Sughrue Mion, PLLC

(57) ABSTRACT

A vehicle lubrication system for a hybrid electric vehicle which includes (i) an engine, (ii) drive wheels, (iii) a power transmission apparatus including an output portion and configured to transmit a power transmitted from the engine and (iv) a driving rotary machine connected to the output portion. The vehicle lubrication system includes (a) a mechanically driven pump connected to the output portion; (b) a fluid passage connected to an outlet of the pump, and configured to supply a lubricant to the driving rotary machine; (c) a relief valve connected to a relieving portion of the fluid passage, which is located between the outlet of the pump and the driving rotary machine in the fluid passage; and (d) an ON-OFF valve provided between the relieving portion and the driving rotary machine in the fluid passage, and configured to selectively allow and inhibit supply of the lubricant to the driving rotary machine.

5 Claims, 3 Drawing Sheets

(56) References Cited

U.S. PATENT DOCUMENTS

| | | | |
|---|---|---|---|
| 2017/0087975 A1* | 3/2017 | Cimatti | B60K 6/383 |
| 2018/0045295 A1* | 2/2018 | Kiyokami | B60K 6/445 |
| 2019/0285165 A1* | 9/2019 | Hashimoto | B60W 20/10 |
| 2020/0130534 A1* | 4/2020 | Julien | H01M 10/6568 |
| 2023/0146341 A1* | 5/2023 | Nakawatari | F16H 57/0483 |
| | | | 180/339 |
| 2023/0184321 A1* | 6/2023 | Nakamura | F16H 57/0482 |
| | | | 184/6.22 |

* cited by examiner

VEHICLE LUBRICATION SYSTEM AND CONTROL APPARATUS FOR THE SYSTEM

This application claims priority from Japanese Patent Application No. 2021-136686 filed on Aug. 24, 2021, the disclosure of which is herein incorporated by reference in its entirety.

FIELD OF THE INVENTION

The present invention relates to a vehicle lubrication system, and more particularly, to a vehicle lubrication system including a pump connected to an output portion of a power transmission apparatus to which a driving rotary machine is connected.

BACKGROUND OF THE INVENTION

There is known a vehicle lubrication system that is to be applied to a hybrid electric vehicle which includes (i) an engine, (ii) drive wheels, (iii) a power transmission apparatus including an output portion and configured to transmit a drive power transmitted from the engine, to the drive wheels through the output portion and (iv) a driving rotary machine connected to the output portion, wherein the vehicle lubrication system includes: (a) a pump which is connected to the output portion and which is to be mechanically driven; (b) a fluid passage which is connected to an outlet of the pump, and which is configured to supply a lubricant to at least the driving rotary machine; (c) a relief valve which is connected to a relieving portion of the fluid passage, the relieving portion being located between the outlet of the pump and the driving rotary machine in the fluid passage. A system disclosed in JP-2019-162927A is an example of such a system. In the disclosed system, a second electric motor MG2 corresponds to the driving rotary machine, an output-shaft MOP 52 corresponds to the pump, and a second oil passage 72 corresponds to the fluid passage. In the present specification, the term "lubrication" means not only means for reducing or preventing friction and wear but also means for cooling a rotary machine or the like by supplying a lubricant thereto.

SUMMARY OF THE INVENTION

However, when a hybrid electric vehicle including the above-described conventional vehicle lubrication system is towed with drive wheels being in contact with a road surface, the driving rotary machine is mechanically driven and rotated by rotation of the drive wheels whereby a circulating current is generated so that a power cable connecting between the driving rotary machine and a PCU (Power Control Unit) is problematically heated. That is, when the hybrid electric vehicle is towed, the pump is mechanically driven by rotation of the drive wheels, and the lubricant outputted from the driven pump is supplied to the driving rotary machine. The driving rotary machine is cooled by the supplied lubricant whereby permanent magnets included in the driving rotary machine are less likely to be demagnetized and accordingly an energizing time of the circulating current is increased, thereby causing a problem that the power cable is heated by the circulating current circulating through the power cable and the power cable is deteriorated.

The present invention was made in view of the background art described above. It is therefore an object of the present invention to suppress heating of the power cable by the circulating current when the hybrid electric vehicle is towed with the drive wheels being in contact with a road surface, wherein the power cable is connected to the driving rotary machine that is mechanically driven by rotation of the drive wheels.

The object indicated above is achieved according to the following aspects of the present invention.

According to a first aspect of the invention, there is provided a vehicle lubrication system that is to be applied to a hybrid electric vehicle which includes (i) an engine, (ii) drive wheels, (iii) a power transmission apparatus including an output portion and configured to transmit a drive power transmitted from the engine, to the drive wheels through the output portion, and (iv) a driving rotary machine connected to the output portion, the vehicle lubrication system comprising: (a) a first pump which is connected to the output portion and which is to be mechanically driven; (b) a first fluid passage which is connected to an outlet of the first pump, and which is configured to supply a lubricant to at least the driving rotary machine; (c) a relief valve which is connected to a relieving portion of the first fluid passage, the relieving portion being located between the outlet of the first pump and the driving rotary machine in the first fluid passage; and (d) an ON-OFF valve which is provided between the relieving portion and the driving rotary machine in the first fluid passage, and which is configured to selectively allow and inhibit supply of the lubricant to at least the driving rotary machine. It is noted the above-described output portion is a portion of the power transmission apparatus, which is to be mechanically rotated by rotation of the drive wheels, and that the driving rotary machine and the first pump, which are connected to the output portion, are to be mechanically rotated by rotation of the drive wheels. The same description is applied to a fifth aspect of the invention, which is described below.

According to a second aspect of the invention, in the vehicle lubrication system according to the first aspect of the invention, there are further provided a radiator configured to supply a cooling fluid; and a lubricant cooler which is provided between the relieving portion and the driving rotary machine in the first fluid passage so as to be arranged in series with the ON-OFF valve, and which is configured to cool the lubricant by the cooling fluid supplied from the radiator, such that the lubricant cooled by the lubricant cooler is supplied to at least the driving rotary machine.

According to a third aspect of the invention, in the vehicle lubrication system according to the first or second aspect of the invention, there are further provided a second pump that is to be mechanically driven by the engine; and a second fluid passage which is connected to an outlet of the second pump and to a junction portion of the first fluid passage, and is configured to supply the lubricant to the driving rotary machine via the first fluid passage, the junction portion being located between the first pump and the relieving portion in the first fluid passage.

According to a fourth aspect of the invention, in the vehicle lubrication system according to any one of the first through third aspects of the invention, the ON-OFF valve is an ON-OFF solenoid valve that is to be electrically switched between an ON state and an OFF state so as to selectively allow and inhibit the supply of the lubricant to at least the driving rotary machine.

According to a fifth aspect of the invention, there is provided a control apparatus for a vehicle lubrication system that is to be applied to a hybrid electric vehicle which includes (i) an engine, (ii) drive wheels, (iii) a power transmission apparatus including an output portion and configured to transmit a drive power transmitted from the engine, to the drive wheels through the output portion and (iv) a driving rotary machine connected to the output portion, wherein the vehicle lubrication system includes: (a) a first pump which is connected to the output portion and which is to be mechanically driven; (b) a second pump that is to be mechanically driven by the engine; (c) a first fluid passage which is connected to an outlet of the first pump, and which is configured to supply a lubricant to at least the driving rotary machine; (d) a relief valve which is connected to a relieving portion of the first fluid passage, the relieving portion being located between the outlet of the first pump and the driving rotary machine in the first fluid passage; (e) a second fluid passage which is connected to an outlet of the second pump and to a junction portion of the first fluid passage, and is configured to supply the lubricant to the driving rotary machine via the first fluid passage, the junction portion being located between the first pump and the relieving portion in the first fluid passage; (f) a radiator configured to supply a cooling fluid; (g) a lubricant cooler which is provided between the relieving portion and the driving rotary machine in the first fluid passage, and which is configured to cool the lubricant by the cooling fluid supplied from the radiator, such that the lubricant cooled by the lubricant cooler is supplied to the driving rotary machine; and (h) an ON-OFF solenoid valve which is provided between the relieving portion and the driving rotary machine in the first fluid passage so as to be arranged in series with the lubricant cooler, and which is configured to selectively allow and inhibit supply of the lubricant to at least the driving rotary machine, wherein the first fluid passage is closed by the ON-OFF solenoid valve when the hybrid electric vehicle is in a power OFF state in which both of the engine and the driving rotary machine are disabled to be operated.

According to a sixth aspect of the invention, in the control apparatus according to the fifth aspect of the invention, the first fluid passage is closed by the ON-OFF solenoid valve when the hybrid electric vehicle is in a power ON state in which both of the engine and the driving rotary machine are able to be operated, in a case in which a temperature of the driving rotary machine is lower than a predetermined allowable temperature and a temperature of the lubricant is lower than a predetermined allowable temperature.

In the vehicle lubrication system according to the first aspect of the invention, the ON-OFF valve is provided in the first fluid passage that is configured to supply the lubricant to the driving rotary machine, so that the supply of the lubricant to the rotary machine can be blocked. Therefore, in a case in which the hybrid electric vehicle is towed with the drive wheels being in contact with a road surface, the hybrid electric vehicle can be towed with the supply of the lubricant to the driving rotary machine being blocked irrespective of whether the first pump is being driven or not. In this case, a temperature of the driving rotary machine that is mechanically driven by rotation of the drive wheels could be increased by generation of a circulating current, and magnetic forces of permanent magnets included in the driving rotary machine are reduced whereby an energizing time of the generated circulating current is reduced, so that heating of a power cable is suppressed. Further, the present invention provides a technical advantage not only in the above-described case in which the hybrid electric vehicle is towed but also in a usual case in which the hybrid electric vehicle is driven to run. For example, in such a usual case, with the ON-OFF valve selectively allowing and inhibiting the supply of the lubricant to the driving rotary machine, for example, depending on a temperature of each part, it is possible to avoid the lubricant from being excessively supplied to at least the driving rotary machine and to increase a fuel economy performance by reducing stirring loss of the lubricant.

In the vehicle lubrication system according to the second aspect of the invention, the lubricant cooler is provided between the relieving portion and the driving rotary machine in the first fluid passage so as to be arranged in series with the ON-OFF valve, and is configured to cool the lubricant by the cooling fluid supplied from the radiator, so that the lubricant cooled by the lubricant cooler is supplied to at least the driving rotary machine whereby at least the driving rotary machine can be efficiently cooled. On the other hand, when the supply of the lubricant to at least the driving rotary machine is stopped by the ON-OFF valve, the lubricant cooler does not provide a cooling effect, so that the lubricant supplied through another fluid passage (other than the first fluid passage) and the lubricant supplied by an oil bath method, for example, can be kept at relatively high temperature whereby increase of viscosity of the lubricant due to temperature reduction can be suppressed whereby the fuel economy performance can be further increased. Further, the reduction of a rate of flow of the lubricant through the lubricant cooler leads to reduction of a heat load of the lubricant cooler, thereby making it possible to reduce a size of the radiator that is provided to cool the cooling fluid supplied to the lubricant cooler.

In the vehicle lubrication system according to the third aspect of the invention, the second pump, which is to be mechanically driven by the engine, is provided, and the lubricant is supplied to the first fluid passage via the second fluid passage that is connected to the second pump. Thus, it is possible to ensure a sufficient rate of flow of the lubricant supplied to at least the driving rotary machine, and to prevent the lubricant from being excessively supplied to at least the driving rotary machine, thereby increasing the fuel economy performance.

In the vehicle lubrication system according to the fourth aspect of the invention, the ON-OFF solenoid valve is used as the ON-OFF valve, so that it is possible to switch from one of the ON state and the OFF state of the ON-OFF solenoid valve to the other state at a desired timing depending on whether the hybrid electric vehicle is towed or not or depending on a temperature of each of various parts. Thus, the technical advantages of the above-described first through third aspects of the invention can be appropriately enjoyed.

In the control apparatus according to the fifth aspect of the invention, when the hybrid electric vehicle is in the power OFF state, the first fluid passage is closed by the ON-OFF solenoid valve that is provided in series with the lubricant cooler. Therefore, when the hybrid electric vehicle is towed in the power OFF state, the lubricant is not supplied to at least the driving rotary machine, irrespective of driving of the first pump that is caused by rotation of the drive wheels. In this case, a temperature of the driving rotary machine that is mechanically driven by rotation of the drive wheels could be increased by generation of the circulating current, and the magnetic forces of the permanent magnets included in the driving rotary machine are reduced by the temperature increase whereby the energizing time of the generated circulating current is reduced, so that heating of the power cable is suppressed. Further, owing to provisions of the first pump, the second pump, the first fluid passage, the second fluid passage and the lubricant cooler, it is possible to ensure a sufficient rate of flow of the lubricant supplied to at least the driving rotary machine, and to efficiently cool at least the driving rotary machine by cooling the lubricant by the lubricant cooler.

In the control apparatus according to the sixth aspect of the invention, also in a case in which the hybrid electric vehicle is normally driven to run in the power ON state, the first fluid passage is closed by the ON-OFF solenoid valve when the temperature of the driving rotary machine and the temperature of the lubricant are lower than the respective allowable temperatures, so that it is possible to avoid the lubricant from being excessively supplied to at least the driving rotary machine and to increase the fuel economy performance by reducing the stirring loss of the lubricant. Further, since the lubricant is prevented from excessively cooled by the lubricant cooler, it is possible to suppress increase of the stirring loss that could be caused by increase of the viscosity of the lubricant due to reduction of temperature of the lubricant, whereby the fuel economy performance can be further increased. Moreover, the reduction of the rate of flow of the lubricant through the lubricant cooler leads to reduction of the heat load of the lubricant cooler, thereby making it possible to reduce the size of the radiator that is provided to cool the cooling fluid supplied to the lubricant cooler.

DETAILED DESCRIPTION OF PREFERRED EMBODIMENT

Figure 1:
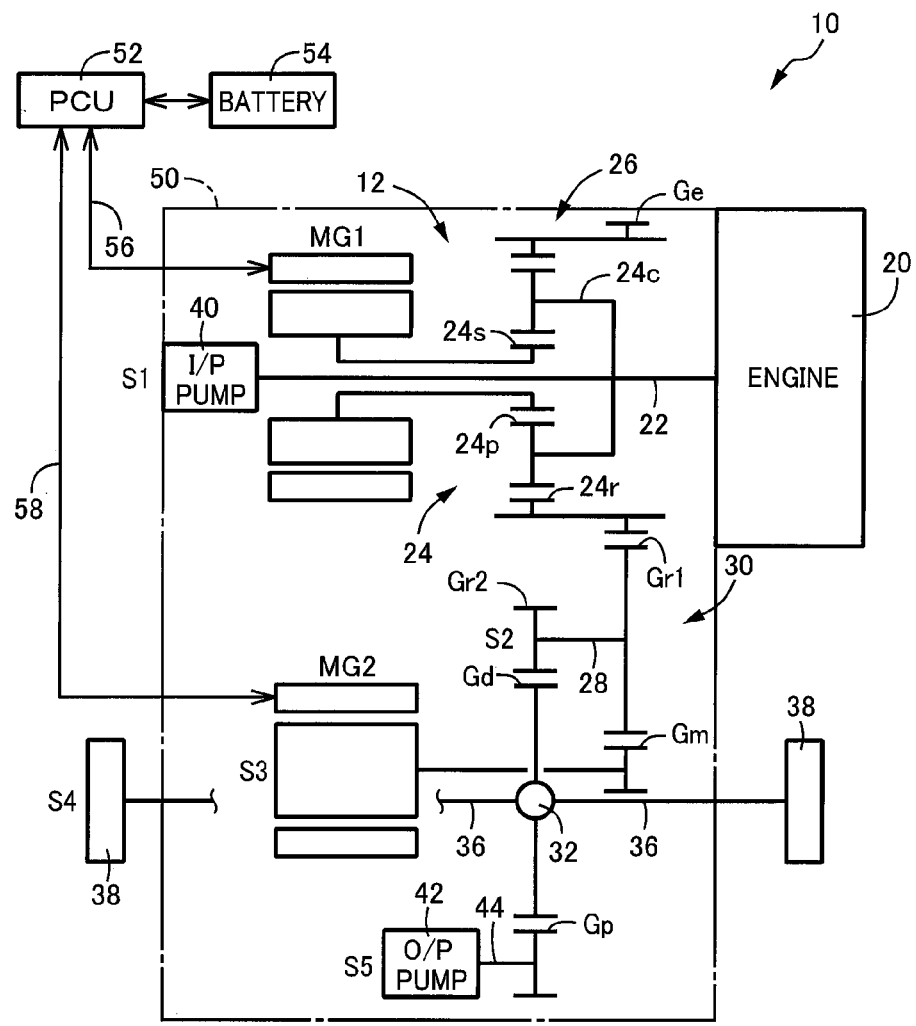
FIG. 1 is an unfolded view schematically showing a power transmission apparatus of a hybrid electric vehicle to which the present invention is applied.

The present invention is applicable to various types of hybrid electric vehicles each including drive power sources in the form of an engine and a driving rotary machine that is connected to an output portion of a power transmission apparatus. The driving rotary machine is preferably a motor generator that is be selectively used as an electric motor and an electric generator. However, the driving rotary machine may be an electric motor. The output portion of the power transmission apparatus, by which the first pump is to be driven, may be a portion that is to be mechanically driven by rotation of the drive wheels, such as a differential device configured to distribute the drive power transmitted from the engine, to the right and left drive wheels.

The power transmission apparatus is preferably a transaxle of lateral installation type that is to be installed in an FF (front engine-front drive) vehicle such that a plurality of axes are arranged to extend in parallel to a lateral (transverse) direction of the vehicle. However, the power transmission apparatus may be a transaxle that is to be installed in a FR (front engine-rear drive) vehicle or a four-wheel drive vehicle. For example, the power transmission apparatus includes an electric differential portion that is constituted mainly by (a) a differential-control rotary machine and (b) a differential mechanism including a first rotary element connected to the engine, a second rotary element connected to the differential-control rotary machine and a third rotary element connected to the above-described output portion of the power transmission apparatus. Although the differential-control rotary machine is preferably a motor generator, the differential-control rotary machine may be an electric generator. With the differential-control rotary machine being controlled to zero, the first, second and third rotary elements of the differential mechanism can be rotated relative to one another, whereby dragging of the engine can be prevented. The differential mechanism of the electric differential portion is preferably constituted by a single planetary gear device of single pinion type or double pinion type. The present invention is applicable also where the hybrid electric vehicle does not include the electric differential portion and where the hybrid electric vehicle includes a step-variable automatic transmission or a continuously-variable automatic transmission.

The first fluid passage may be configured to supply also to the differential-control rotary machine of the electric differential portion, as needed. The first fluid passage may be provided with the lubricant cooler, as needed, such that the lubricant cooler is disposed between the relieving portion (at which the relief valve is connected) and the driving rotary machine in the first fluid passage, so that the lubricant cooled by the lubricant cooler is supplied to the driving rotary machine and the differential-control rotary machine. The lubricant cooler is preferably a water-cooled lubricant cooler configured to cool the lubricant by a cooling fluid supplied from a radiator, for example. However, the lubricant cooler may be also an air-cooled lubricant cooler configured to cool the lubricant by air cooling. Where the lubricant cooler is the air-cooled lubricant cooler, the radiator may be either a radiator serving exclusively for the vehicle lubrication system, or a radiator serving for other cooling system for cooling the engine, for example, in addition to serving for the vehicle lubrication system. The ON-OFF valve, by which the first fluid passage is to be closed, is preferably disposed on an upstream side of the lubricant cooler, namely, between the lubricant cooler and the relieving portion in the first fluid passage. However, the ON-OFF valve may be disposed on a downstream side of the lubricant cooler, namely, between the lubricant cooler and the driving rotary machine in the first fluid passage.

In addition to the first pump, a second pump, which is to be mechanically driven by rotation of the engine, may be provided, so as to increase a rate of flow of the lubricant by connecting the first fluid passage to a second fluid passage that is connected to the second pump. However, the second pump may be provided as needed, and may be omitted. Further, it is possible to provide, in place of or in addition to the second pump, an electric fluid pump that can supply the lubricant at a desired timing.

The ON-OFF valve, which is provided in the first fluid passage, is preferably an ON-OFF solenoid valve that can be electrically switched between an ON state and an OFF state. However, the ON-OFF valve may be also a mechanical ON-OFF valve that is to be placed in the OFF state by a biasing member such as a spring and is to be placed in the ON state by a hydraulic pressure outputted from the second pump, for example. Further, it is possible to employ a mechanical ON-OFF valve that is to be switched between the ON state and the OFF state by a thermostat or the like. Where the ON-OFF valve is the ON-OFF solenoid valve, the ON-OFF solenoid valve is preferably a normally-closed ON-OFF solenoid valve that is to be placed in the OFF state, when supply of an excitation current thereto is stopped, for example, in the power OFF state in which a main power of the hybrid electric vehicle is stopped. However, where the hybrid electric vehicle is to be towed or where the excitation current is controllable when the vehicle is towed, the ON-OFF solenoid valve may be a normally-open ON-OFF solenoid valve. Moreover, the ON-OFF solenoid valve may be also a linear solenoid valve defining a distribution cross section that is continuously variable.

Where the ON-OFF valve is the ON-OFF solenoid valve, the ON-OFF solenoid valve may be controlled to close the first fluid passage, for example, when the temperature of the driving rotary machine and the temperature of the lubricant are lower than respective allowable temperatures. However, the ON-OFF solenoid valve may be controlled to be opened or closed, depending on only one of the temperature of the driving rotary machine and the temperature of the lubricant, or depending on a temperature of another part or a vehicle state, for example. The temperature of the lubricant reflects on a temperature of each of various parts (such as the differential mechanism and the differential device) to be lubricated, and can be regarded as the temperature of one of the various parts. Further, the ON-OFF solenoid valve may be controlled to be opened or closed, depending on a detected temperature of a gear or other lubricated part, in place of the temperature of the lubricant.

Embodiment

There will be described an embodiment of the present invention in details with reference to drawings. It is noted that figures of the drawings are simplified or deformed as needed, and each portion is not necessarily precisely depicted in terms of dimension ratio, shape, etc.

FIG. 1 is an unfolded view schematically showing a power transmission apparatus 12 of a hybrid electric vehicle 10 (hereinafter simply referred to as "vehicle 10") to which the present invention is applied, wherein the view is an unfolded view illustrating the power transmission apparatus 12 in a manner in which a plurality of axes of the power transmission apparatus 12 are contained in a single plane. The power transmission apparatus 12 is a hybrid electric vehicle transaxle of a lateral installation type in which the plurality of axes are arranged to extend in parallel to a width (lateral) direction of the vehicle 10, and is to be used advantageously for a vehicle of FF (front drive-force source and front drive) system. In the present embodiment, the plurality of axes consist of first, second, third, fourth and fifth axes S1, S2, S3, S4, S5. An input shaft 22, which is connected to the engine 20, is provided on the first axis S1. A planetary gear device 24 of single pinion type and a first rotary machine MG1 are provided to be coaxial with the first axis S1. The engine 20 is an internal combustion engine such as a gasoline engine or a diesel engine, which is configured to generate a drive power by combustion of a fuel. The input shaft 22 passes through axes of the planetary gear device 24 and the first rotary machine MG1, and protrudes in a direction away from the engine 20 so as to drive and rotate an I/P pump (input pump) 40. The I/P pump 40 is a mechanical fluid pump (mechanical oil pump) which is connected to the input shaft 22, and is to be mechanically driven and rotated by the engine 20 through the input shaft 22. It is noted that the I/P pump 40 corresponds to "second pump" recited in the appended claims.

The planetary gear device 24 is a known planetary gear device of single pinion type including three rotary elements in the form of a carrier 24c, a sun gear 24s and a ring gear 24r, wherein the carrier 24c holds a plurality of pinions 24p such that each of the pinions 24p is rotatable about its axis and is revolvable about an axis of the planetary gear device 24 and such that each of the pinions 24p meshes with the sun gear 24s and the ring gear 24r. That is, the planetary gear device 24 is a differential mechanism in which a power transmission is made among the carrier 24c, sun gear 24s and ring gear 24r through the pinions 24p. In the planetary gear device 24, the carrier 24c as a first rotary element is connected to the input shaft 22, i.e., to the engine 20, the sun gear 24s as a second rotary element is connected to the first rotary machine MG1, and the ring gear 24r as a third rotary element is connected to an engine output gear Ge as an output member. Since the sun gear 24s, carrier 24c and ring gear 24r are rotatable relative to one another, the planetary gear device 24 functions as a power dividing mechanism in which the power of the engine 20 is distributed to the first rotary machine MG1 and the engine output gear Ge, and the first rotary machine MG1 is driven and rotated by the power of the engine 20 transmitted to the first rotary machine MG1.

The first rotary machine MG1 is a motor generator that functions selectively as the electric motor and the electric generator. When the first rotary machine MG1 is driven and rotated by the engine 20, the first rotary machine MG1 is subjected to a regenerative control so as to function as the electric generator, such that a battery 54 is charged through a PCU (Power Control Unit) 52 by an electric energy generated by the first rotary machine MG1, and/or such that a second rotary machine MG2 is driven and rotated by the generated electric energy. Each of the first and second rotary machines MG1, MG2 is a permanent-magnet-type rotary machine (such as three-phase AC synchronous motor) including a rotor using permanent magnets. The first and second rotary machines MG1, MG2 are connected to the PCU 52 through power cables 56, 58 through which a high-voltage electric current is transmittable. The battery 54 is a high-voltage battery of at least 50 V, for example. The PCU 52 includes a DC-DC converter and an inverter.

The planetary gear device 24 and the first rotary machine MG1 cooperate with each other to constitute an electric differential portion 26. The first rotary machine MG1, which constitutes a differential-control rotary machine, is to be operated selectively as the electric motor and the electric generator. For example, in a regenerative control in which the first rotary machine MG1 is operated as the electric generator, a rotational speed of the sun gear 24s is controlled in a continuously changing manner, whereby a rotational speed transmitted from the engine 20 is continuously changed and is outputted through the engine output gear Ge. That is, the electric differential portion 26 may be regarded as an electric continuously variable transmission providing a gear ratio γ (=engine rotational speed Ne/output rotational speed Nout) that is continuously variable, wherein the engine rotational speed Ne is a rotational speed of the engine 20, and the output rotational speed Nout is a rotational speed of the engine output gear Ge. Thus, irrespective of change of the output rotational speed Nout corresponding to a running speed V of the vehicle 10, the electric differential portion 26 can cause the engine 20 to be operated, for example, at a constant fuel-economy-performance maximizing operation point that maximizes a fuel economy performance of the vehicle 10, namely, the engine 20 to be operated, for example, at the engine rotational speed Ne and the engine torque Te that cooperate with each other to define the constant fuel-economy-performance maximizing operation point. Further, with a torque of the first rotary machine MG1 being controlled to zero, the sun gear 24s is idled or freely rotated whereby dragging of the engine 20 is prevented when the operation of the engine 20 is stopped during running of the vehicle 10.

On the second axis S2, there is provided a reduction gear device 30 in which a large reduction gear Gr1 and a small reduction gear Gr2 are disposed in respective axially opposite end portions of a shaft 28. The large reduction gear Gr1 meshes with the engine output gear Ge and also with a motor output gear Gm of the second rotary machine MG2, which is disposed on the third axis S3. The second rotary machine MG2 is a motor generator that functions selectively as an electric motor and an electric generator. For example, when being subjected to a power driving control by an electric power supplied from the battery 54 through the PCU 52, the second rotary machine MG2 functions as the electric motor, so as to be used as a drive power source for driving the vehicle 10. The second rotary machine MG2 corresponds to "driving rotary machine" recited in the appended claims.

The small reduction gear Gr2 meshes with a differential ring gear Gd of a differential device 32, which is disposed on the fourth axis S4. The drive power transmitted from the engine 20 and/or the second rotary machine MG2 to the large reduction gear Gr1 is distributed from the small reduction gear Gr2 through the differential device 32 to right and left drive shafts 36 and is then transmitted to right and left drive wheels 38. In the present embodiment, the drive wheels 38 are front wheels that are steerable. The differential ring gear Gd meshes with a pump drive gear Gp that is disposed on a pump shaft 44 of an O/P pump (output pump) 42, which is disposed on the fifth axis S5, so that the O/P pump 42 is mechanically driven by rotation of the differential device 32. The reduction gear device 30 including the large reduction gear Gr1 and the small reduction gear Gr2 cooperates with the differential device 32 to constitute "output portion" recited in the appended claims. The O/P pump 42 is a mechanical fluid pump (mechanical oil pump) that is to be mechanically driven by rotation of the differential device 32 as the output portion. The O/P pump 42 may be driven by adapting the pump drive gear Gp to mesh with a rotary member (such as the large reduction gear Gr1 and the small reduction gear Gr2) that is to be rotated mechanically in conjunction with the differential device 32, or with a gear or the like which is additionally provided on, for example, the shaft 28 and which serves exclusively for driving the O/P pump 42. It is noted that the O/P pump 42 corresponds to "first pump" recited in the appended claims.

The power transmission apparatus 12 includes a transaxle casing 50 (hereinafter simply referred to as "casing 50") that is integrally fixed to the engine 20. The casing 50 consists of a plurality of casing members that are fixed to each other through a multiplicity of fastener bolts.

In the vehicle 10 including the power transmission apparatus 12 constructed as described above, it is possible to establish a BEV (Battery Electric Vehicle) driving mode and an HEV (Hybrid Electric Vehicle) driving mode. In the BEV driving mode, the vehicle 10 runs using only the second rotary machine MG2 as the drive power source and keeping the engine 20 stopped. In the HEV (Hybrid Electric Vehicle) driving mode, the vehicle 10 runs using at least the engine 20 as the drive power source.

Figure 2:
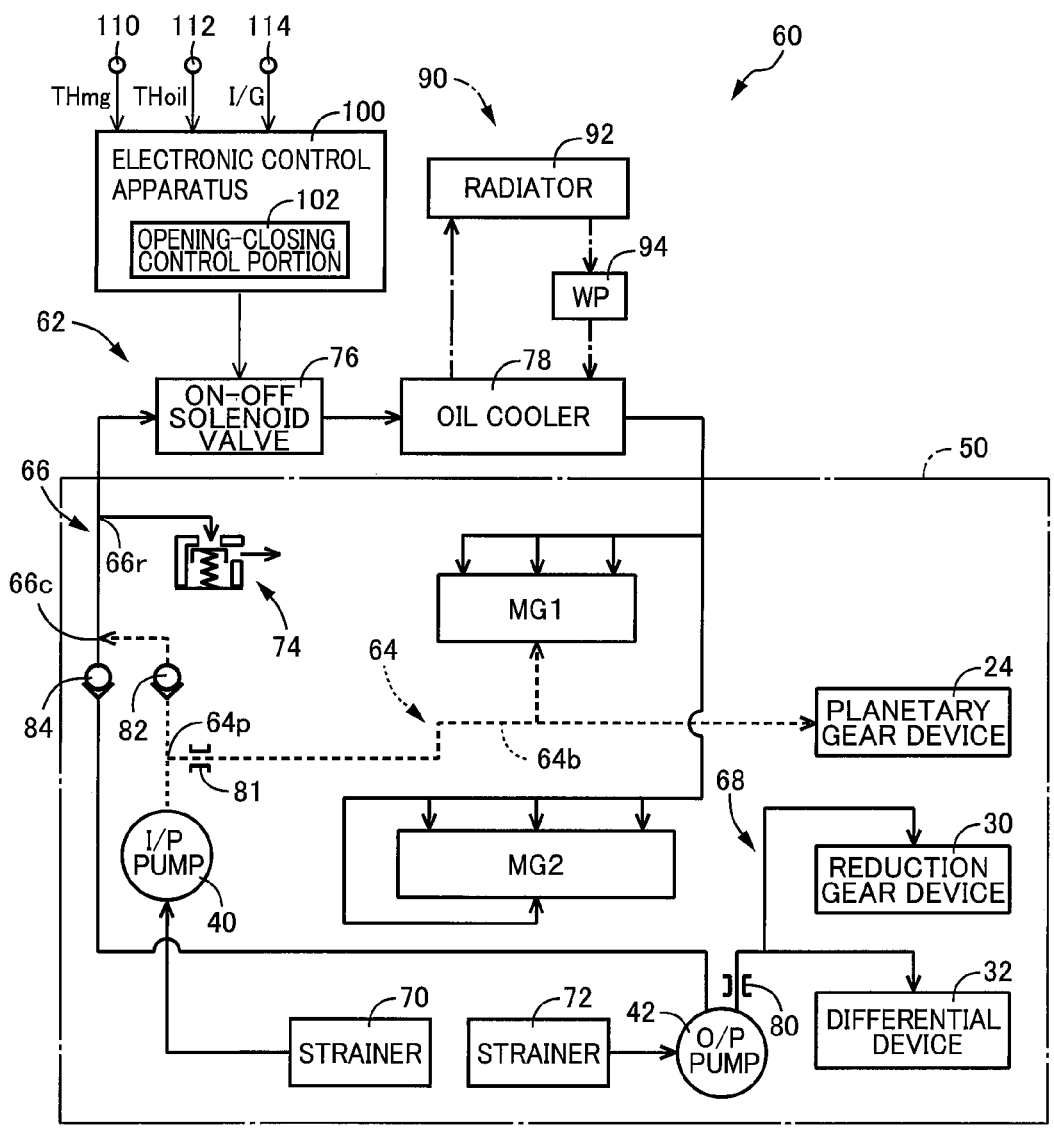
FIG. 2 is a block diagram for explaining a vehicle lubrication system included in the hybrid electric vehicle shown in FIG. 1.

FIG. 2 is a block diagram showing a vehicle lubrication system 60 provided in the vehicle 10. This vehicle lubrication system 60 includes a lubricant circulation circuit 62 for supplying a lubricant to various parts to be lubricated, a refrigerant circulation circuit 90 and an electronic control apparatus 100. The lubricant circulation circuit 62 includes suction devices in the form of the above-described I/P pump 40 and O/P pump 42 cooperate with each other to lubricate the various parts of the power transmission apparatus 12 through an I/P fluid passage 64, a first O/P fluid passage 66 and a second O/P fluid passage 68. In FIG. 2, the I/P fluid passage 64 is represented by solid line, while the first and second O/P fluid passages 66, 68 are represented by broken lines. Each of the I/P pump 40 and the O/P pump 42 is configured to suck the lubricant, through a corresponding one of strainers 70, 72, from a lubricant storage portion provided in a bottom portion of the casing 50, and to output the lubricant to the I/P fluid passage 64 or O/P fluid passages 66. In the present embodiment, the strainers 70, 72 are provided independently of each other. However, the strainers 70, 72 may be replaced by a single common strainer from which both of the I/P pump 40 and the O/P pump 42 suck the lubricant. It is noted that the first O/P fluid passage 66 corresponds to "first fluid passage" recited in the appended claims and that the I/P fluid passage 64 corresponds to "second fluid passage" recited in the appended claims.

The O/P pump 42 is connected to the differential device 32 so as to be mechanically driven and rotated. Thus, even in the BEV driving mode in which the engine 20 is stopped, the O/P pump 42 is driven and rotated, and can supply the lubricant to the various parts by sucking the lubricant at a suction rate that is dependent on the vehicle running speed V. Meanwhile, the I/P pump 40 is to be driven and rotated by the engine 20 that could be driven even when the vehicle 10 is stopped, so that the I/P pump 40 can supply the lubricant to the various parts by sucking the lubricant at a suction rate that is independent from the vehicle running speed V even during stop of the vehicle 10, but the I/P pump 40 is stopped in the BEV driving mode in which the engine 20 is stopped. It is preferable that each of the I/P pump 40 and the O/P pump 42 is, for example, a gear oil pump such as an internal gear pump and an external gear pump, or a vane oil pump.

The first O/P fluid passage 66 is connected to an outlet of the O/P pump 42, so as to supply the lubricant to the rotary machines MG1, MG2. In FIG. 2, downward arrows directed to the rotary machines MG1, MG2 indicate that the lubricant is caused to flow down from above each of the rotary machines MG1, MG2, so as to cool a stator of each of the rotary machines MG1, MG2, for example. The lubricant is caused to flow down to, namely, supplied to each of the rotary machines MG1, MG2, through, for example, fluid holes formed through side walls or the like of the casing 50, or pipes or the like provided in the casing 50. Further, upward arrows directed to the rotary machines MG1, MG2 indicate that the lubricant is supplied from a central portion of each of the rotary machines MG1, MG2, so as to cool and lubricate bearings and a rotor of each of the rotary machines MG1, MG2, with the lubricant being discharged through fluid holes formed through the input shaft 22 and a rotor shaft of each of the rotary machines MG1, MG2, for example. A relief valve 74 is connected to a relieving portion 66r of the first O/P fluid passage 66, wherein the relieving portion 66r being located in an intermediate position before reaching the rotary machines MG1, MG2, namely, between the outlet of the O/P pump 42 and each of the rotary machines MG1, MG2 in the first O/P fluid passage 66, so that a hydraulic pressure in the first O/P fluid passage 66 is prevented from being excessively increased. Further, between the relieving portion 66r (to which the relief valve 74 is connected) and each of the rotary machines MG1, MG2, an ON-OFF solenoid valve 76 and an oil cooler (lubricant cooler) 78 are provided, such that the ON-OFF solenoid valve 76 and the oil cooler 78 are arranged in series with each other in this order of description. Specifically, the ON-OFF solenoid valve 76 is located between the relieving portion 66r and the oil cooler 78 in the first O/P fluid passage 66, so that the lubricant having passed through the ON-OFF solenoid valve 76 is cooled by the oil cooler 78 and is then supplied to the rotary machines MG1, MG2. The ON-OFF solenoid valve 76 is a normally-closed ON-OFF solenoid valve that is configured, when supply of an excitation current thereto is stopped, to be placed in its OFF state so as to block flow of the lubricant toward the rotary machines MG1, MG2 through the first O/P fluid passage 66. The first O/P fluid passage 66 corresponds to an O/P fluid passage configured to supply the lubricant discharged from the O/P pump 42, to the second rotary machine MG2 serving as the driving rotary machine, for example.

In present embodiment, the oil cooler 78 is a water-cooled cooler configured to cool the lubricant by water cooling, and is disposed outside the casing 50. A refrigerant circulation circuit 90, which is represented by one-dot chain line in FIG. 2, is connected to the oil cooler 78, such that the lubricant is to be cooled by thermal exchange with a refrigerant (cooling fluid) of the refrigerant circulation circuit 90. The refrigerant circulation circuit 90 is configured to circulate the refrigerant such as a coolant, and includes a radiator 92 and a refrigerant pump (WP) 94. The radiator 92 is an air-cooled heat exchanger configured to cool the refrigerant by an outside air, and disposed on a front side of the engine 20 and the power transmission apparatus 12 in the vehicle 10. The radiator 92 may be provided with an electric cooling fan or the like, as needed. With operation of the refrigerant pump 94, the refrigerant is circulated in the refrigerant circulation circuit 90, and the refrigerant cooled by the radiator 92 is supplied to the oil cooler 78, whereby the lubricant of the power transmission apparatus 12 is cooled by the refrigerant. The oil cooler 78 serves also as an oil warmer for warming the power transmission apparatus 12 at a low temperature. In the present embodiment, the refrigerant pump 94 is constituted by a mechanical pump that is to be mechanically driven and rotated by the engine 20 or a power transmission shaft or the like, for example, during running of the vehicle 10. However, the refrigerant pump 94 may be constituted by an electric pump that can be operated at a desired timing.

The second O/P fluid passage 68 is connected to another outlet of the O/P pump 42, and is configured to supply the lubricant via an orifice 80 to the reduction gear device 30 and the differential device 32, for example. Owing to the orifice 80, a rate of flow of the lubricant into the second O/P fluid passage 68 is limited, so that it is possible to suppress an excessive increase of the hydraulic pressure in the second O/P fluid passage 68, and to appropriately ensure a rate of flow of the lubricant into the first O/P fluid passage 66 from the O/P pump 42. This second O/P fluid passage 68 may be defined by pipes provided independently of the casing 50, or fluid holes provided in the casing 50, for example. At least a part of each of the reduction gear device 30 and the differential device 32 is immersed in the lubricant storage portion provided in the bottom portion of the casing 50, so as to be lubricated by an oil bath method. Further, the various parts of the power transmission apparatus 12 are lubricated by the lubricant scooped up by the immersed part.

The FP fluid passage 64 is connected to an outlet of the FP pump 40 and also to the first O/P fluid passage 66, so as to supply the lubricant to the rotary machines MG1, MG2 via the first O/P fluid passage 66. The I/P fluid passage 64 is connected to a junction portion 66c of the first O/P fluid passage 66, wherein the junction portion 66c is located between the relieving portion 66r and the O/P pump 42 in the first O/P fluid passage 66. The I/P fluid passage 64 is provided with a check valve 82 which is disposed between the junction portion 66c and the FP pump 40 in the I/P fluid passage 64 and which is configured to allow flow of the lubricant in a direction toward the junction portion 66c and to inhibit flow of the lubricant in an opposite direction toward the FP pump 40. The first O/P fluid passage 66 is provided with a check valve 84 which is disposed between the junction portion 66c and the O/P pump 42 in the first O/P fluid passage 66 and which is configured to allow flow of the lubricant in a direction toward the junction portion 66c and to inhibit flow of the lubricant in an opposite direction toward the O/P pump 42. The FP fluid passage 64 includes a branch fluid passage 64b that is branched at a branch portion 64p that is located between the check valve 82 and the FP pump 40 in the I/P fluid passage 64, so that the I/P fluid passage 64 is configured to supply the lubricant to the first rotary machine MG1 and the planetary gear device 24 of the electric differential portion 26, via the branch fluid passage 64b. The branch fluid passage 64b is provided with an orifice 81 that is configured to limit a rate of flow of the lubricant from the branch portion 64p into the branch fluid passage 64b, thereby suppressing excessive increase of the hydraulic pressure in the branch fluid passage 64b and appropriately ensuring a rate of flow of the lubricant from the branch portion 64p into the first O/P fluid passage 66. The branch fluid passage 64b is configured to supply the lubricant, for example, through fluid holes formed through the input shaft 22 and a rotor shaft of the first rotary machine MG1, so as to cool the rotor of the first rotary machine MG1 and lubricate mutually meshing gears and bearings or the like of the planetary gear device 24.

The electronic control apparatus 100 is a control apparatus for the vehicle lubrication system 60, for mainly controlling an operation state of the ON-OFF solenoid valve 76. The electronic control apparatus 100 may be configured to control the engine 20 and the rotary machines MG1, MG2 in addition to the ON-OFF solenoid valve 76. The electronic control apparatus 100 is configured to receive, from an MG temperature sensor 110, a fluid temperature sensor 112 and an I/G (ignition) switch 114, signals indicative of an MG temperature THmg, a lubricant temperature THoil, ON/OFF of the I/G switch 114 and other signals indicative of various information required for control operations. The MG temperature THmg is a temperature of the second rotary machine MG2 as the driving rotary machine, and represents, for example, a detected temperature of a stator coil of the second rotary machine MG2 which is detected by the MG temperature sensor 110. The lubricant temperature THoil is a temperature of the lubricant in the power transmission apparatus 12, and represents, for example, a detected temperature of the lubricant stored in the lubricant storage portion provided in the bottom portion of the casing 50, which is detected by the fluid temperature sensor 112. The lubricant temperature THoil reflects a temperature of each of various lubricated parts of the power transmission apparatus 12 such as the planetary gear device 24, reduction gear device 30 and differential device 32, so that the lubricant temperature THoil can be regarded as the temperature of each of the various lubricated parts. The PG switch 114 is a switch which is provided near a driver's seat, and which is to be operated by a driver of the vehicle 10, so as to be selectively placed in an ON position and an OFF position for thereby selectively turning on and off a main power of the vehicle 10. In an PG OFF state in which the I/G switch 114 is placed in the OFF position, all of the engine 20 and the rotary machines MG1, MG2 are disabled to be operated. In an PG ON state in which the I/G switch 114 is placed in the ON position, all of the engine 20 and the rotary machines MG1, MG2 are able to be operated. When the vehicle 10 is to be towed, for example, in event of a failure of the vehicle 10 in which the vehicle 10 cannot be moved by itself, the I/G switch 114 is placed in the OFF position. The I/G switch 114 corresponds to a power switch. When the PG switch 114 is placed in the ON position, the vehicle 10 is placed in a power ON state. When the PG switch 114 is placed in the OFF position, the vehicle 10 is placed in a power OFF state.

The electronic control apparatus 100 includes a so-called microcomputer incorporating a CPU, a ROM, a RAM and an input-output interface. The CPU is configured to control the operation state of the ON-OFF solenoid valve 76, by processing various input signals, according to control programs stored in the ROM, while utilizing a temporary data storage function of the RAM. That is, the electronic control apparatus 100 functionally includes an opening-closing control portion 102 configured to control open/close of the ON-OFF solenoid valve 76, by executing a control routine that is shown in a flow chart of FIG. 3.

Figure 3:
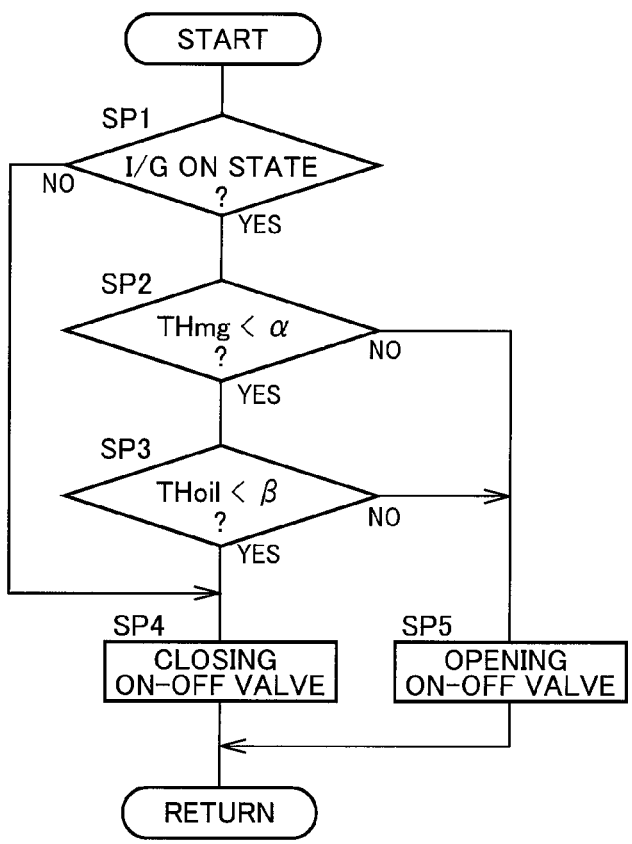
FIG. 3 is a flow chart for explaining operation of an open-close control portion functionally included in an electronic control apparatus for the vehicle lubrication system shown in FIG. 2.

As shown in FIG. 3, the control routine is initiated with step SP1 that is implemented to determine whether the PG ON state is established or not. When the I/G ON state is established, namely, when the vehicle 10 is normally operated, step SP2 and the subsequent steps are implemented. When the I/G OFF state is established, the control flow goes to step SP4 that is immediately implemented to close the ON-OFF solenoid valve 76, namely, to place the ON-OFF solenoid valve 76 into the OFF state. With the ON-OFF solenoid valve 76 being placed into the OFF state, the first O/P fluid passage 66 is closed whereby flow of the lubricant from the oil cooler 78 toward the rotary machines MG1, MG2 is blocked. In the present embodiment, the ON-OFF solenoid valve 76 is a normally-closed ON-OFF solenoid valve, so that the ON-OFF solenoid valve 76 is placed in the OFF state even without a particular control in the I/G OFF state in which the excitation current is not supplied to the ON-OFF solenoid valve 76. Therefore, when the vehicle 10 is to be towed with the drive wheels 38 being in contact with a road surface, even if the lubricant is supplied to the first O/P fluid passage 66 with the O/P pump 42 being driven, the lubricant is blocked from being supplied to the rotary machines MG1, MG2.

At step SP2 that is implemented following the step SP1 when the I/G ON state is established, it is determined whether the MG temperature THmg is lower than a predetermined allowable temperature α or not. When the MG temperature THmg is not lower than the allowable temperature α (THmg≥α), the control flow goes to step SP5 at which the ON-OFF solenoid valve 76 is placed into ON state. With the ON-OFF solenoid valve 76 being placed in the ON state, the lubricant supplied to the first O/P fluid passage 66 from the I/P pump 40 or the O/P pump 42 is supplied to the rotary machines MG1, MG2 through the ON-OFF solenoid valve 76 and the oil cooler 78, whereby the rotary machines MG1, MG2 are cooled by the lubricant that has been cooled by the oil cooler 78. The allowable temperature α corresponds to an upper limit of a temperature range in which the second rotary machine MG2 does not need to be cooled. Although the allowable temperature α is pre-set to a constant value that is obtained through an experimentation or the like, the allowable temperature α may be set to a variable value that is variable depending on a vehicle state such as an accelerator operation amount (drive power requested amount).

When an affirmative determination (YES) is made at the above-described step SP2, namely, when the MG temperature THmg is lower than the allowable temperature α (THmg<α), step SP3 is implemented to determine whether the lubricant temperature THoil is lower than a predetermined allowable temperature β or not. When the lubricant temperature THoil is not lower than the allowable temperature β (THoil≥β), the control flow goes to step SP5 at which the ON-OFF solenoid valve 76 is placed into ON state. With the ON-OFF solenoid valve 76 being placed in the ON state, the lubricant supplied to the first O/P fluid passage 66 from the I/P pump 40 or the O/P pump 42 is supplied to the rotary machines MG1, MG2 through the ON-OFF solenoid valve 76 and the oil cooler 78, whereby the rotary machines MG1, MG2 are cooled by the lubricant that has been cooled by the oil cooler 78. Further, the cooled lubricant is supplied to the planetary gear device 24 and the reduction gear device 30, for example, via other fluid passages such as the branch fluid passage 64b and the second O/P fluid passage 68, whereby the various parts disposed in the power transmission apparatus 12 are appropriately cooled. The lubricant temperature THoil reflects the temperature of the various parts of the power transmission apparatus 12. The allowable temperature β corresponds to an upper limit of a temperature range in which the lubricant does not need to be cooled by the oil cooler 78. Although the allowable temperature β is pre-set to a constant value that is obtained through an experimentation or the like, the allowable temperature β may be set to a variable value that is variable depending on a vehicle state such as the accelerator operation amount (drive power requested amount).

When affirmative determinations (YES) are made at both of the step SP2 and step SP3, namely, when the MG temperature THmg is lower than the allowable temperature α and the lubricant temperature THoil is lower than the allowable temperature β, the second rotary machine MG2 and the lubricant do not need to be cooled more, so that step SP4 is implemented to place the ON-OFF solenoid valve 76 into the OFF state. With the ON-OFF solenoid valve 76 being placed in the OFF state, even if the lubricant is supplied to the first O/P fluid passage 66 from the I/P pump 40 or the O/P pump 42, the flow of the lubricant is blocked by the ON-OFF solenoid valve 76 whereby the supply of the lubricant through the oil cooler 78 to the rotary machines MG1, MG2 is prevented, so that the lubricant is prevented from excessively cooled by the lubricant cooler, it is possible to increase the fuel economy performance by reducing the stirring loss that could be increased if the lubricant were excessively supplied to the rotary machines MG1, MG2. Further, since the lubricant is prevented from being excessively cooled by the oil cooler 78, the lubricant supplied through other fluid passages such as the second O/P fluid passage 68 and the branch fluid passage 64b and the lubricant supplied by the oil bath method can be kept at relatively high temperature, so that it is possible to suppress increase of the stirring loss that could be caused by increase of the viscosity of the lubricant due to reduction of the temperature of the lubricant, whereby the fuel economy performance can be further increased. Moreover, the reduction of the rate of flow of the lubricant through the oil cooler 78 leads to reduction of the heat load of the oil cooler 78, thereby making it possible to reduce the size of the radiator 92 that is provided to cool the refrigerant supplied to the oil cooler 78.

In the vehicle lubrication system 60 of the present embodiment, when the vehicle 10 is in the power OFF state, the first O/P fluid passage 66 is closed by the ON-OFF solenoid valve 76 that is provided in series with the oil cooler 78. Therefore, when the vehicle 10 is towed in the power OFF state, the lubricant is not supplied to second rotary machine MG2 and the second rotary machine MG2 is not cooled, irrespective of driving of the O/P pump 42 that is caused by rotation of the drive wheels 38. Therefore, the temperature of the second rotary machine MG2 that is mechanically driven by rotation of the drive wheels could be increased by generation of the circulating current, and the magnetic forces of the permanent magnets are reduced by the temperature increase. Thus, the circulating current is reduced and the energizing time of the circulating current is reduced, so that heating of the power cable 58 is suppressed.

Further, owing to provisions of the I/P pump 40, I/P fluid passage 64, O/P pump 42, O/P fluid passages 66, 68 and oil cooler 78, it is possible to ensure a sufficient rate of flow of the lubricant supplied to at least the rotary machines MG1, MG2 and to efficiently cool at least the rotary machines MG1, MG2 by cooling the lubricant by the oil cooler 78.

Further, also in the case in which the vehicle 10 is normally driven to run in the power ON state, the first O/P fluid passage 66 is closed by the ON-OFF solenoid valve 76 when the MG temperature THmg and the lubricant temperature THoil are lower than the respective allowable temperatures α, β, so that it is possible to avoid the lubricant from being excessively supplied to rotary machines MG1, MG2 and to increase the fuel economy performance by reducing the stirring loss of the lubricant. Further, since the lubricant is prevented from excessively cooled by the oil cooler 78, the lubricant supplied through the second O/P fluid passage 68 and the branch fluid passage 64*b* and the lubricant supplied by the oil bath method can be kept at relatively high temperature whereby increase of the viscosity of the lubricant due to reduction of the lubricant temperature THoil can be suppressed whereby the fuel economy performance can be further increased. Moreover, the reduction of the rate of flow of the lubricant through the oil cooler 78 leads to reduction of the heat load of the oil cooler 78, thereby making it possible to reduce the size of the radiator 92 that is provided to cool the refrigerant supplied to the oil cooler 78.

It is to be understood that the embodiment described above is given for illustrative purpose only, and that the present invention may be embodied with various modifications and improvements which may occur to those skilled in the art.

NOMENCLATURE OF ELEMENTS

10: hybrid electric vehicle
12: power transmission apparatus
20: engine
30: reduction gear device (output portion)
32: differential device (output portion)
38: drive wheels
40: I/P pump (second pump)
42: O/P pump (first pump)
60: vehicle lubrication system
64: I/P fluid passage (second fluid passage)
66: first O/P fluid passage (first fluid passage)
66*r*: relieving portion
74: relief valve
76: ON-OFF solenoid valve (ON-OFF valve)
78: oil cooler (lubricant cooler)
92: radiator
100: electronic control apparatus (control apparatus)
MG2: second rotary machine (driving rotary machine)
THmg: MG temperature (temperature of driving rotary machine)
THoil: lubricant temperature
α: allowable temperature
β: allowable temperature

What is claimed is:

1. A vehicle lubrication system that is to be applied to a hybrid electric vehicle which includes (i) an engine, (ii) drive wheels, (iii) a power transmission apparatus including an output portion and configured to transmit a drive power transmitted from the engine, to the drive wheels through the output portion and (iv) a driving rotary machine connected to the output portion, the vehicle lubrication system comprising:
a first pump which is connected to the output portion and which is to be mechanically driven;
a first fluid passage which is connected to an outlet of the first pump, and which is configured to supply a lubricant to at least the driving rotary machine;
a relief valve which is connected to a relieving portion of the first fluid passage, the relieving portion being located between the outlet of the first pump and the driving rotary machine in the first fluid passage; and
an ON-OFF valve which is provided between the relieving portion and the driving rotary machine in the first fluid passage, and which is configured to selectively allow and inhibit supply of the lubricant to at least the driving rotary machine;
a second pump that is to be mechanically driven by the engine; and
a second fluid passage which is connected to an outlet of the second pump and to a junction portion of the first fluid passage, and is configured to supply the lubricant to the driving rotary machine via the first fluid passage, the junction portion being located between the first pump and the relieving portion in the first fluid passage.

2. The vehicle lubrication system according to claim 1, further comprising:
a radiator configured to supply a cooling fluid; and
a lubricant cooler which is provided between the relieving portion and the driving rotary machine in the first fluid passage so as to be arranged in series with the ON-OFF valve, and which is configured to cool the lubricant by the cooling fluid supplied from the radiator, such that the lubricant cooled by the lubricant cooler is supplied to at least the driving rotary machine.

3. The vehicle lubrication system according to claim 1, wherein the ON-OFF valve is an ON-OFF solenoid valve that is to be electrically switched between an ON state and an OFF state so as to selectively allow and inhibit the supply of the lubricant to at least the driving rotary machine.

4. A control apparatus for a vehicle lubrication system that is to be applied to a hybrid electric vehicle which includes (i) an engine, (ii) drive wheels, (iii) a power transmission apparatus including an output portion and configured to transmit a drive power transmitted from the engine, to the drive wheels through the output portion and (iv) a driving rotary machine connected to the output portion, wherein the vehicle lubrication system includes:
a first pump which is connected to the output portion and which is to be mechanically driven;
a second pump that is to be mechanically driven by the engine;
a first fluid passage which is connected to an outlet of the first pump, and which is configured to supply a lubricant to at least the driving rotary machine;
a relief valve which is connected to a relieving portion of the first fluid passage, the relieving portion being located between the outlet of the first pump and the driving rotary machine in the first fluid passage;

a second fluid passage which is connected to an outlet of the second pump and to a junction portion of the first fluid passage, and is configured to supply the lubricant to the driving rotary machine via the first fluid passage, the junction portion being located between the first pump and the relieving portion in the first fluid passage;

a radiator configured to supply a cooling fluid;

a lubricant cooler which is provided between the relieving portion and the driving rotary machine in the first fluid passage, and which is configured to cool the lubricant by the cooling fluid supplied from the radiator, such that the lubricant cooled by the lubricant cooler is supplied to the driving rotary machine; and an ON-OFF solenoid valve which is provided between the relieving portion and the driving rotary machine in the first fluid passage so as to be arranged in series with the lubricant cooler, and which is configured to selectively allow and inhibit supply of the lubricant to at least the driving rotary machine, wherein the first fluid passage is closed by the ON-OFF solenoid valve when the hybrid electric vehicle is in a power OFF state in which both of the engine and the driving rotary machine are disabled to be operated.

5. The control apparatus according to claim 4, wherein the first fluid passage is closed by the ON-OFF solenoid valve when the hybrid electric vehicle is in a power ON state in which both of the engine and the driving rotary machine are able to be operated, in a case in which a temperature of the driving rotary machine is lower than a predetermined allowable temperature and a temperature of the lubricant is lower than a predetermined allowable temperature.

* * * * *